(12) United States Patent
Poorsartep (10) Patent No.: US 12,344,191 B2
(45) Date of Patent: Jul. 1, 2025

(54) REMOVEABLE FOOT HOLDS IN A TRUCK CAB FOR AN AUTONOMOUS VEHICLE

(71) Applicant: TUSIMPLE, INC, San Diego, CA (US)

(72) Inventor: Mohammad Poorsartep, Los Gatos, CA (US)

(73) Assignee: TUSIMPLE, INC., San Diego, CA (US)

( * ) Notice: Subject to any disclaimer, the term of this patent is extended or adjusted under 35 U.S.C. 154(b) by 251 days.

(21) Appl. No.: 18/144,077

(22) Filed: May 5, 2023

(65) Prior Publication Data

US 2023/0356691 A1 Nov. 9, 2023

Related U.S. Application Data (60) Provisional application No. 63/339,893, filed on May 9, 2022.

(51) Int. Cl.
    *B60R 25/01* (2013.01)
    *B60R 3/02* (2006.01)
    *B60R 25/33* (2013.01)

(52) U.S. Cl.
    CPC .............. *B60R 25/01* (2013.01); *B60R 3/02* (2013.01); *B60R 25/33* (2013.01)

(58) Field of Classification Search
    None
    See application file for complete search history.

(56) References Cited

U.S. PATENT DOCUMENTS

| | | | |
|---|---|---|---|
| 6,581,712 B1 * | 6/2003 | Nathans | B60R 25/255 180/287 |
| 6,658,572 B1 | 12/2003 | Craig | |
| 9,082,237 B2 * | 7/2015 | Breed | G07C 9/00563 |
| 9,527,448 B1 * | 12/2016 | Kay | E06C 5/28 |
| 10,131,362 B1 * | 11/2018 | Gingrich | B60W 40/08 |
| 11,119,490 B1 * | 9/2021 | Christensen | G05D 1/0214 |
| 2002/0113400 A1 * | 8/2002 | Leitner | B60R 3/02 280/166 |
| 2003/0111894 A1 * | 6/2003 | Wattenburg | B60R 25/00 303/7 |
| 2005/0242971 A1 * | 11/2005 | Dryer | B60R 25/102 340/539.19 |
| 2005/0258616 A1 * | 11/2005 | Scheuring | B60R 3/02 280/166 |
| 2006/0181049 A1 * | 8/2006 | Kobayashi | B60R 3/02 182/127 |
| 2012/0139206 A1 * | 6/2012 | May | B60R 3/02 280/166 |
| 2017/0246992 A1 * | 8/2017 | Giesmann | E06C 5/24 |
| 2018/0307834 A1 * | 10/2018 | Xue | G06F 21/554 |
| 2020/0026281 A1 * | 1/2020 | Xiao | G06Q 10/0631 |

(Continued)

*Primary Examiner* — Jonathan M Dager
(74) *Attorney, Agent, or Firm* — Perkins Coie LLP (57) ABSTRACT

An autonomous vehicle (AV) security system comprising an autonomous vehicle (AV) having a vehicle sensor subsystem, vehicle drive subsystems, an in-vehicle control computer, and vehicle drive subsystems comprising an actuator mechanism configured to receive one or more commands, from an oversight system, for extending or retracting a stairs assembly, where the oversight system transmits the one or more commands to the autonomous control subsystem based on determining a risk of hijacking the AV.

20 Claims, 10 Drawing Sheets

(56) References Cited

U.S. PATENT DOCUMENTS

| | | | |
|---|---|---|---|
| 2021/0146842 A1* | 5/2021 | Niemela | B60R 9/06 |
| 2022/0153232 A1* | 5/2022 | Gallagher | A61G 3/062 |
| 2022/0289137 A1* | 9/2022 | Yates | B60R 25/102 |
| 2022/0314890 A1* | 10/2022 | Sands, II | B60R 3/02 |
| 2023/0140569 A1* | 5/2023 | Foster | B60W 60/0017 |
| | | | 701/400 |

* cited by examiner

REMOVEABLE FOOT HOLDS IN A TRUCK CAB FOR AN AUTONOMOUS VEHICLE

CROSS-REFERENCE TO RELATED APPLICATIONS

The present application claims priority to U.S. Provisional Patent Application No. 63/339,893, filed on May 9, 2022, which is incorporated by reference herein in its entirety.

TECHNICAL FIELD

The present disclosure relates generally to autonomous vehicles. More particularly, the present disclosure is related to operating an autonomous vehicle (AV) appropriately on public roads, highways, and locations with other vehicles or pedestrians.

BACKGROUND

One aim of autonomous vehicle technologies is to provide vehicles that can safely navigate towards a destination with limited or no driver assistance. The safe navigation of an autonomous vehicle (AV) from one point to another may include the ability to signal other vehicles, navigating around other vehicles in shoulders or emergency lanes, changing lanes, biasing appropriately in a lane, and navigate all portions or types of highway lanes. Autonomous vehicle technologies may enable an AV to operate without requiring extensive learning or training by surrounding drivers, by ensuring that the AV can operate safely, in a way that is evident, logical, or familiar to surrounding drivers and pedestrians.

SUMMARY

Systems and methods are described herein that allow an autonomous vehicle (AV) to navigate from a first point to a second point without a human driver present in the AV and to comply with instructions for safe and lawful operation.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Vehicles traversing highways and roadways are legally required to comply with regulations and statues in the course of safe operation of the vehicle. For autonomous vehicles (AVs), particularly autonomous tractor trailers, the ability to recognize a malfunction in its systems and stop safely are necessary for lawful and safe operation of the vehicle. Described below in detail are systems and methods for the safe and lawful operation of an autonomous vehicle on a roadway, including the execution of maneuvers that bring the autonomous vehicle in compliance with the law while protecting the vehicle from physical entry by unauthorized individuals.

Figure 1:
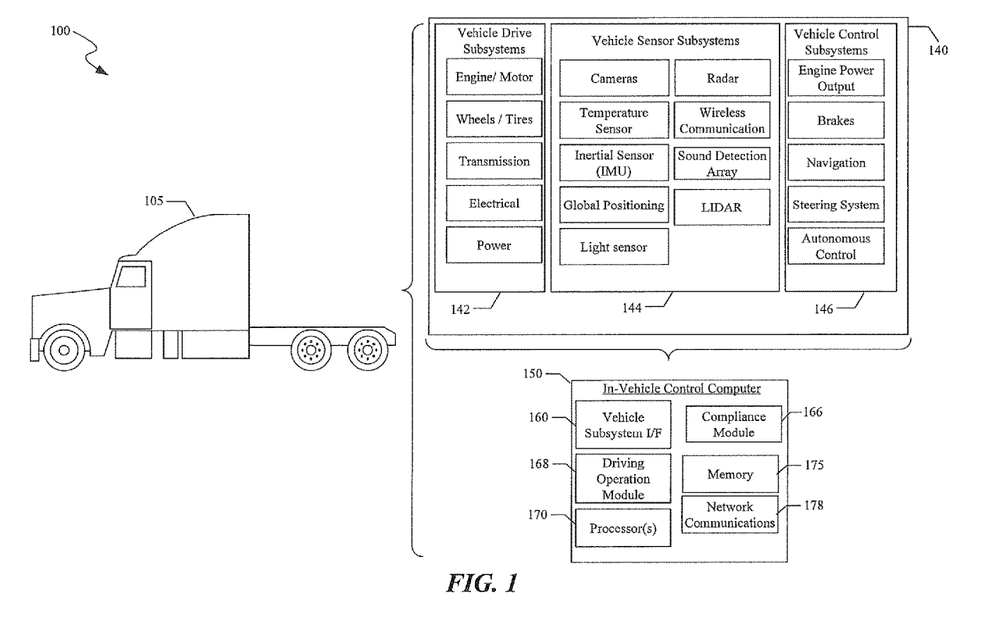
FIG. 1 illustrates a schematic diagram of a system including an autonomous vehicle.

FIG. 1 shows a system 100 that includes a tractor 105 of an autonomous truck. The tractor 105 includes a plurality of vehicle subsystems 140 and an in-vehicle control computer 150. The plurality of vehicle subsystems 140 includes vehicle drive subsystems 142, vehicle sensor subsystems 144, and vehicle control subsystems 146. An engine or motor, wheels and tires, a transmission, an electrical subsystem, and a power subsystem may be included in the vehicle drive subsystems. The engine of the autonomous truck may be an internal combustion engine, a fuel-cell powered electric engine, a battery powered electrical engine, a hybrid engine, or any other type of engine capable of moving the wheels on which the tractor 105 moves. The tractor 105 have multiple motors or actuators to drive the wheels of the vehicle, such that the vehicle drive subsystems 142 include two or more electrically driven motors. The transmission may include a continuous variable transmission or a set number of gears that translate the power created by the engine into a force that drives the wheels of the vehicle. The vehicle drive subsystems may include an electrical system that monitors and controls the distribution of electrical current to components within the system, including pumps, fans, and actuators. The power subsystem of the vehicle drive subsystem may include components that regulate the power source of the vehicle.

Vehicle sensor subsystems 144 can include sensors for general operation of the autonomous truck 105, including those which would indicate a malfunction in the AV or another cause for an AV to perform a limited or minimal risk condition (MRC) maneuver. The sensors for general operation of the autonomous vehicle may include cameras, a temperature sensor, an inertial sensor (IMU), a global positioning system (GPS), a light sensor, a light detection and ranging (LIDAR) system, a radar system, and wireless communications.

A sound detection array, such as a microphone or array of microphones, may be included in the vehicle sensor subsystem 144. The microphones of the sound detection array are configured to receive audio indications of the presence of, or instructions from, authorities, including sirens and command such as "Pull over." These microphones are mounted, or located, on the external portion of the vehicle, specifically on the outside of the tractor portion of an autonomous truck 105. Microphones used may be any suitable type, mounted such that they are effective both when the autonomous truck 105 is at rest, as well as when it is moving at normal driving speeds.

Cameras included in the vehicle sensor subsystems 144 may be rear-facing so that flashing lights from emergency vehicles may be observed from all around the autonomous truck 105. These cameras may include video cameras, cameras with filters for specific wavelengths, as well as any other cameras suitable to detect emergency vehicle lights based on color, flashing, of both color and flashing.

The vehicle control subsystem 146 may be configured to control operation of the autonomous vehicle, or truck, 105 and its components. Accordingly, the vehicle control subsystem 146 may include various elements such as an engine power output subsystem, a brake unit, a navigation unit, a steering system, and an autonomous control unit. The engine power output may control the operation of the engine, including the torque produced or horsepower provided, as well as provide control the gear selection of the transmission. The brake unit can include any combination of mechanisms configured to decelerate the autonomous vehicle 105. The brake unit can use friction to slow the wheels in a standard manner. The brake unit may include an Anti-lock brake system (ABS) that can prevent the brakes from locking up when the brakes are applied. The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the GPS device and one or more predetermined maps so as to determine the driving path and/or location for the autonomous vehicle 105. The steering system may represent any combination of mechanisms that may be operable to adjust the heading of autonomous vehicle 105 in an autonomous mode or in a driver-controlled mode.

The autonomous control unit may represent a control system configured to identify, evaluate, and avoid or otherwise negotiate potential obstacles in the environment of the autonomous vehicle 105. In general, the autonomous control unit may be configured to control the autonomous vehicle 105 for operation without a driver or to provide driver assistance in controlling the autonomous vehicle 105. In some embodiments, the autonomous control unit may be configured to incorporate data from the GPS device, the RADAR, the LiDAR (i.e. LIDAR), the cameras, and/or other vehicle subsystems to determine the driving path or trajectory for the autonomous vehicle 105. The autonomous control that may activate systems that the AV 105 has which are not present in a conventional vehicle, including those systems which can allow an AV to communicate with surrounding drivers or signal surrounding vehicles or drivers for safe operation of the AV.

An in-vehicle control computer 150, which may be referred to as a VCU, includes a vehicle subsystem interface 160, a driving operation module 168, one or more processors 170, a compliance module 166, a memory 175, and a network communications subsystem 178. This in-vehicle control computer 150 controls many, if not all, of the operations of the autonomous truck 105 in response to information from the various vehicle subsystems 140. The one or more processors 170 execute the operations that allow the system to determine the health of the AV, such as whether the AV has a malfunction or has encountered a situation requiring service or a deviation from normal operation and giving instructions. Data from the vehicle sensor subsystems 144 is provided to VCU 150 so that the determination of the status of the AV can be made. The compliance module 166 determines what action should be taken by the autonomous truck 105 to operate according to the applicable (i.e. local) regulations. Data from other vehicle sensor subsystems 144 may be provided to the compliance module 166 so that the best course of action in light of the AV's status may be appropriately determined and performed. Alternatively, or additionally, the compliance module 166 may determine the course of action in conjunction with another operational or control module, such as the driving operation module 168.

The memory 175 may contain additional instructions as well, including instructions to transmit data to, receive data from, interact with, or control one or more of the vehicle drive subsystem 142, the vehicle sensor subsystem 144, and the vehicle control subsystem 146 including the autonomous Control system. The in-vehicle control computer (VCU) 150 may control the function of the autonomous vehicle 105 based on inputs received from various vehicle subsystems (e.g., the vehicle drive subsystem 142, the vehicle sensor subsystem 144, and the vehicle control subsystem 146). Additionally, the VCU 150 may send information to the vehicle control subsystems 146 to direct the trajectory, velocity, signaling behaviors, and the like, of the autonomous vehicle 105. The autonomous control vehicle control subsystem may receive a course of action to be taken from the compliance module 166 of the VCU 150 and consequently relay instructions to other subsystems to execute the course of action.

Figure 2:
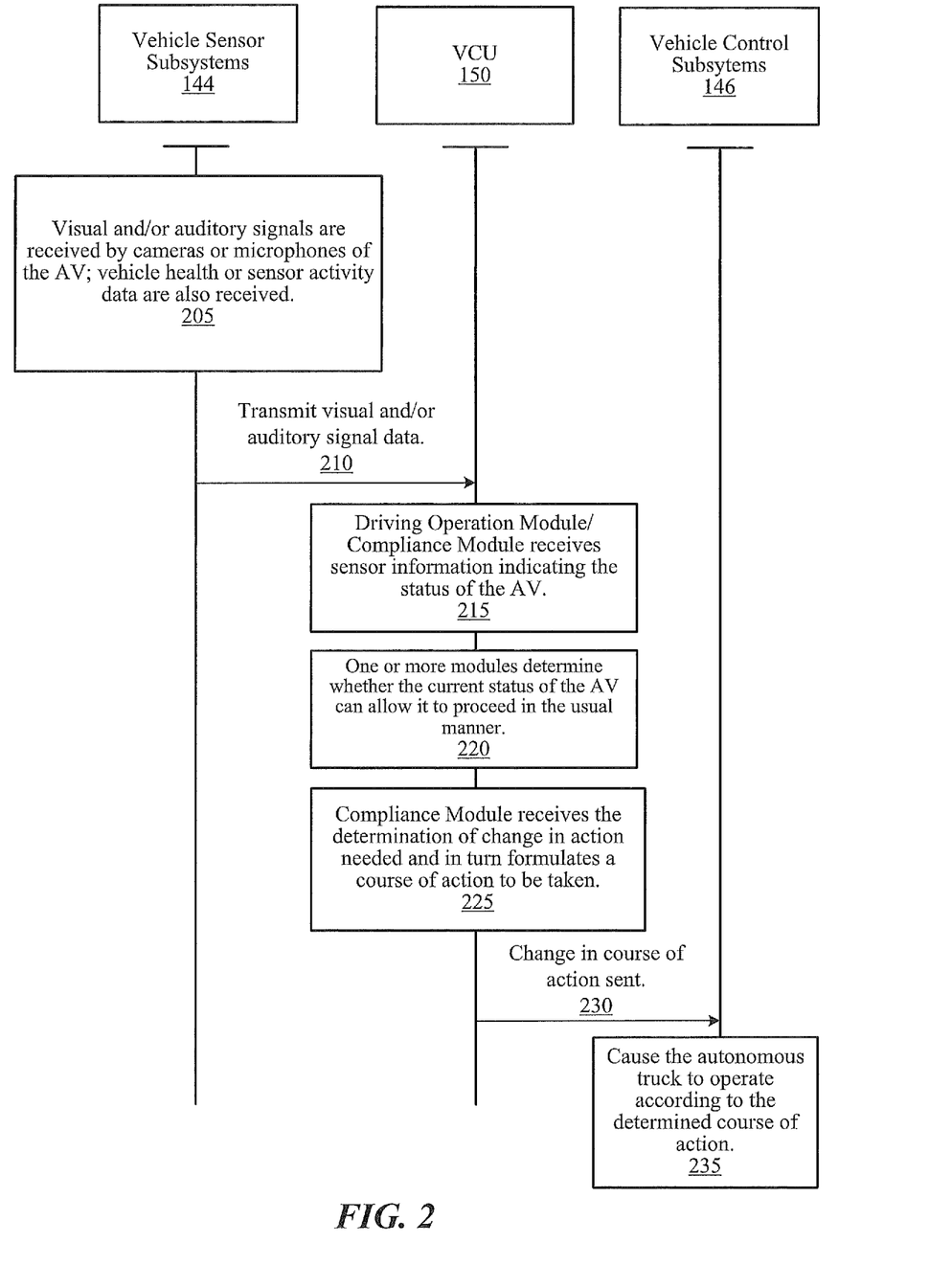
FIG. 2 shows a flow diagram for operation of an autonomous vehicle (AV) safely in light of the health and surroundings of the AV.

FIG. 2 shows a flow diagram for operation of an autonomous vehicle (AV) safely in light of the health and surroundings of the AV. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

As shown in FIG. 2, the vehicle sensor subsystem 144 receives visual, auditory, or both visual and auditory signals indicating the environmental condition of the AV, as well as vehicle health or sensor activity data are received in step 205. These visual and/or auditory signal data are transmitted from the vehicle sensor subsystem 144 to the in-vehicle control computer system (VCU) 150, as in step 210. Any of the driving operation module and the compliance module receive the data transmitted from the vehicle sensor subsystem, in step 215. Then, one or both of those modules determine whether the current status of the AV can allow it to proceed in the usual manner or that the AV needs to alter its course to prevent damage or injury or to allow for service in step 220. The information indicating that a change to the course of the AV is needed may include an indicator of sensor malfunction; an indicator of a malfunction in the engine, brakes, or other components necessary for the operation of the autonomous vehicle; a determination of a visual instruction from authorities such as flares, cones, or signage; a determination of authority personnel present on the roadway; a determination of a law enforcement vehicle on the roadway approaching the autonomous vehicle, including from which direction; and a determination of a law enforcement or first responder vehicle moving away from or on a separate roadway from the autonomous vehicle. This information indicating that a change to the AV's course of action is needed may be used by the compliance module to formulate a new course of action to be taken which accounts for the AV's health and surroundings, in step 225. The course of action to be taken may include slowing, stopping, moving into a shoulder, changing route, changing lane while staying on the same general route, and the like. The course of action to be taken may include initiating communications with any oversight or human interaction systems present on the autonomous vehicle. The course of action to be taken may then be transmitted from the VCU 150 to the autonomous control system, in step 230. The vehicle control subsystems 146 then cause the autonomous truck 105 to operate in accordance with the course of action to be taken that was received from the VCU 150 in step 235.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

Autonomous Truck Oversight System

Figure 3:
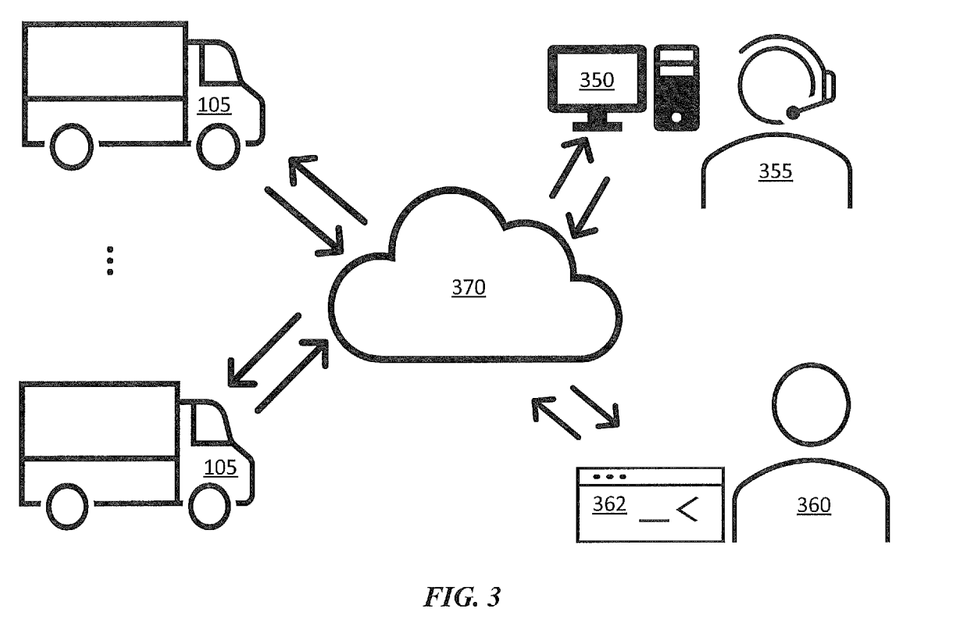
FIG. 3 illustrates a system that includes one or more autonomous vehicles, a control center or oversight system with a human operator (e.g., a remote center operator (RCO)), and an interface for third-party interaction.

FIG. 3 illustrates a system 300 that includes one or more autonomous vehicles 105, a control center or oversight system 350 with a human operator 355, and an interface 362 for third-party 360 interaction. A human operator 355 may also be known as a remoter center operator (RCO). Communications between the autonomous vehicles 105, oversight system 350 and user interface 362 take place over a network 370. In some instances, where not all the autonomous vehicles 105 in a fleet are able to communicate with the oversight system 350, the autonomous vehicles 105 may communicate with each other over the network 370 or directly. As described with respect to FIG. 1, the VCU 150 of each autonomous vehicle 105 may include a module for network communications 178.

An autonomous truck may be in communication with an oversight system. The oversight system may serve many purposes, including: tracking the progress of one or more autonomous vehicles (e.g., an autonomous truck); tracking the progress of a fleet of autonomous vehicles; sending maneuvering instructions to one or more autonomous vehicles; monitoring the health of the autonomous vehicle(s); monitoring the status of the cargo of each autonomous vehicle in contact with the oversight system; facilitate communications between third parties (e.g., law enforcement, clients whose cargo is being carried) and each, or a specific, autonomous vehicle; allow for tracking of specific autonomous trucks in communication with the oversight system (e.g., third-party tracking of a subset of vehicles in a fleet); arranging maintenance service for the autonomous vehicles (e.g., oil changing, fueling, maintaining the levels of other fluids); alerting an affected autonomous vehicle of changes in traffic or weather that may adversely impact a route or delivery plan; pushing over the air updates to autonomous trucks to keep all components up to date; and other purposes or functions that improve the safety for the autonomous vehicle, its cargo, and its surroundings. An oversight system may also determine performance parameters of an autonomous vehicle or autonomous truck, including any of: data logging frequency, compression rate, location, data type; communication prioritization; how frequently to service the autonomous vehicle (e.g., how many miles between services); when to perform a minimal risk condition (MRC) maneuver while monitoring the vehicle's progress during the maneuver; when to hand over control of the autonomous vehicle to a human driver (e.g., at a destination yard); ensuring an autonomous vehicle passes pre-trip inspection; ensuring an autonomous vehicle performs or conforms to legal requirements at checkpoints and weight stations; ensuring an autonomous vehicle performs or conforms to instructions from a human at the site of a roadblock, cross-walk, intersection, construction, or accident; and the like.

In one embodiment, the oversight 350 (FIG. 3) system may execute hijacking response operations that includes locking out the retractable stairs to deter unauthorized persons from entering the autonomous truck. The hijacking response operations may also include locking out the AV control input devices by preventing any of the AV's drive subsystems 140 (FIG. 1) from influencing the operation of the vehicle. In some embodiments, the hijacking response operations may be executed in response to receiving information about the geographic location of the AV. Moreover, the oversight system may restrict the access to the cabin in response to AV entering or being outside a predetermined geographic range. In some embodiments, a predetermined geographic range can include a service terminal, a loading yard, or a weigh station. According to another aspect of the invention, the oversight system may execute hijacking response operations in response to receiving information from the vehicle sensor subsystems 144 of the AV indicating the risk of the AV being hacked/hijacked. Any number of hijack risk thresholds may be implemented in the oversight system, which may be used to determine the degree of hijacking risk or the degree of authentication. For example, multiple risk thresholds may be provided, wherein an increased degree of authentication may be required by the oversight system when each threshold is reached and/or exceeded. In another embodiment, the information indicating the risk of the AV being hacked/hijacked received from the vehicle sensor subsystems 144 of the AV may include information about the risk of interference with the AV communication. For example, another unauthorized user can interfere with the oversight system's communication with the AV in an unauthorized manner. An unauthorized user may interfere with the oversight system's commands to the AV, which may affect control of the AV.

Figure 4A:
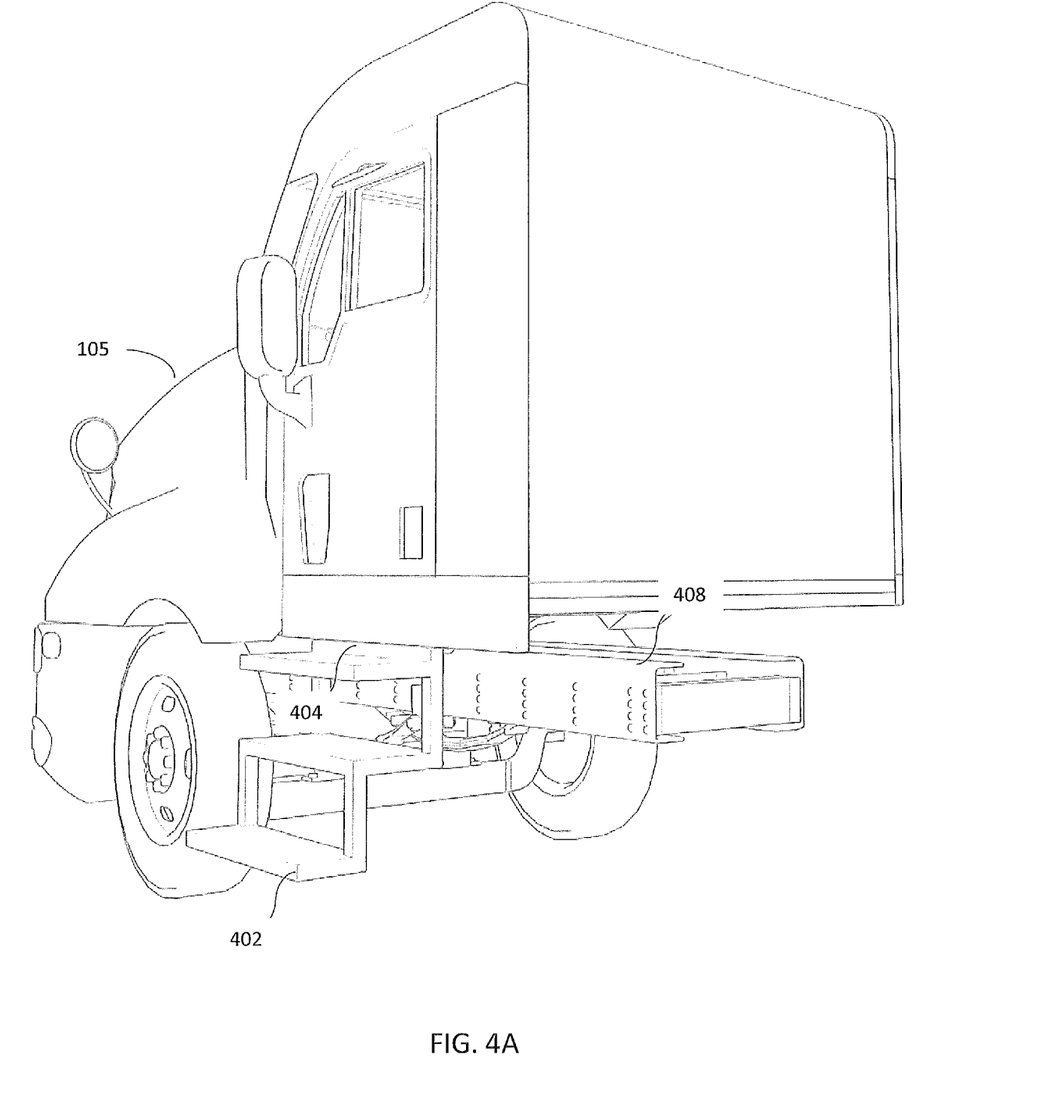
FIG. 4A illustrates an example of an AV with retractable stairs hinged to the cabin in an advanced position according to some embodiments.
Figure 4B:
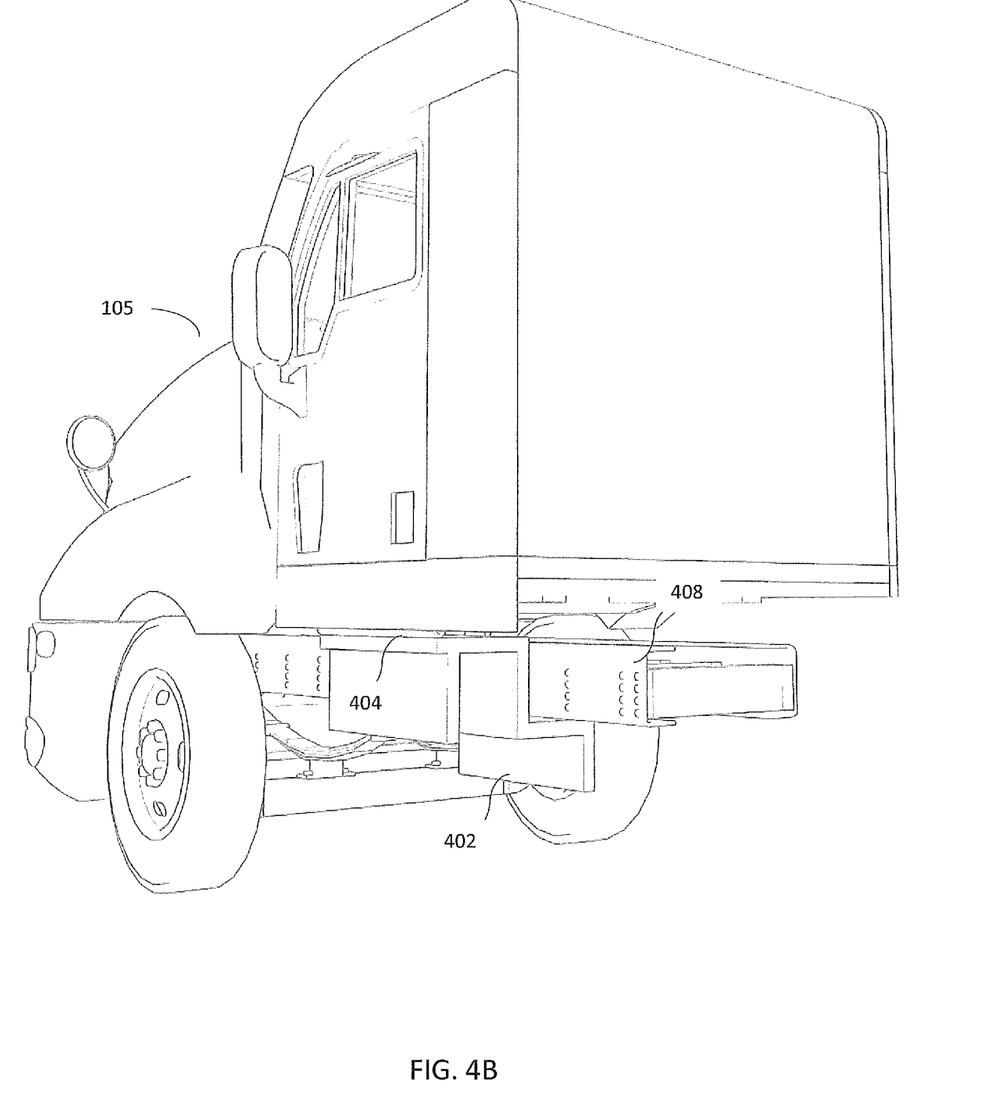
FIG. 4B illustrates an example of an AV with retractable stairs hinged to the cabin in the retracted position according to some embodiments.

In some embodiments, the AV may include retractable stairs 402 hinged to a cabin 105 and controlled by the oversight system 350 (FIG. 3) as illustrated in FIG. 4A. As shown in FIG. 4A, the retractable stairs 402 may be hingedly connected to the cabin 105 of the AV. In some embodiments, a hinged joint/actuator mechanism 404 connecting the retractable stairs assembly 402 to the cabin 105 may be configured to rotate the retractable stairs assembly 402 by approximately 180 degrees from the advanced position to the retracted position. In various exemplary embodiments, the retractable stairs assembly 402 may include a locking pin or rotor-limiting plates, restricting the rotational movement of the stairs assembly 402. In some embodiments, an actuator mechanism 404 coupled (wired or wirelessly) to the oversight system may be provided to rotate the retractable stairs assembly 402 from an advanced position to the retractable position as shown in FIG. 4B. According to the exemplary embodiment, a rotator unit controlled by the actuator mechanism 404 can be secured to a chassis 408 or the cabin 105 of the AV by bolts rivets, wielding or other mounting techniques. In accordance with various embodiments, various actuator mechanisms, servo motors, pneumatic systems, etc. known in the art for automatically opening and closing doors and/or extending and retracting stairs via computer control may be utilized in accordance with the embodiments described herein.

Figure 4C:
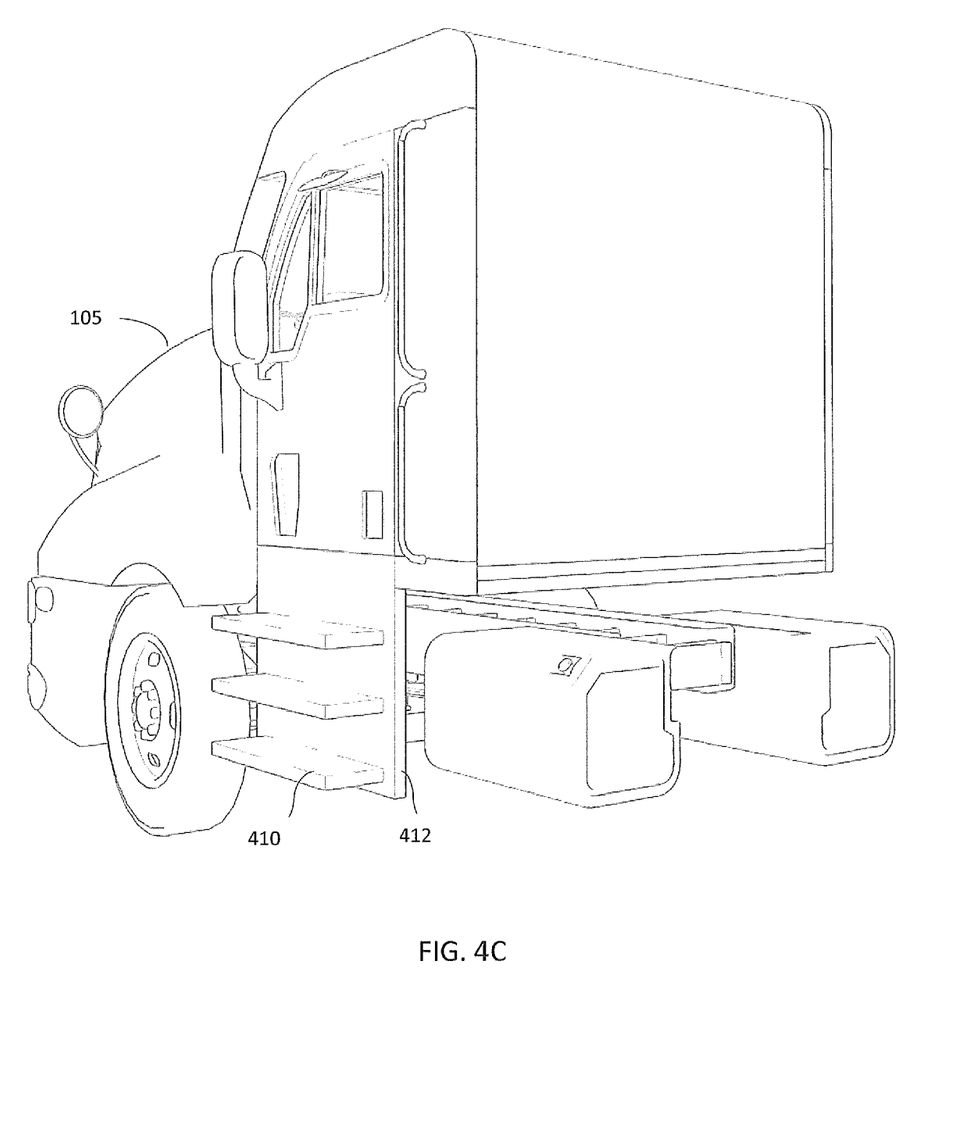
FIG. 4C illustrates an example of an AV with retractable stairs assembly extending vertically from the cabin door in an advanced position according to some embodiments.
Figure 4D:
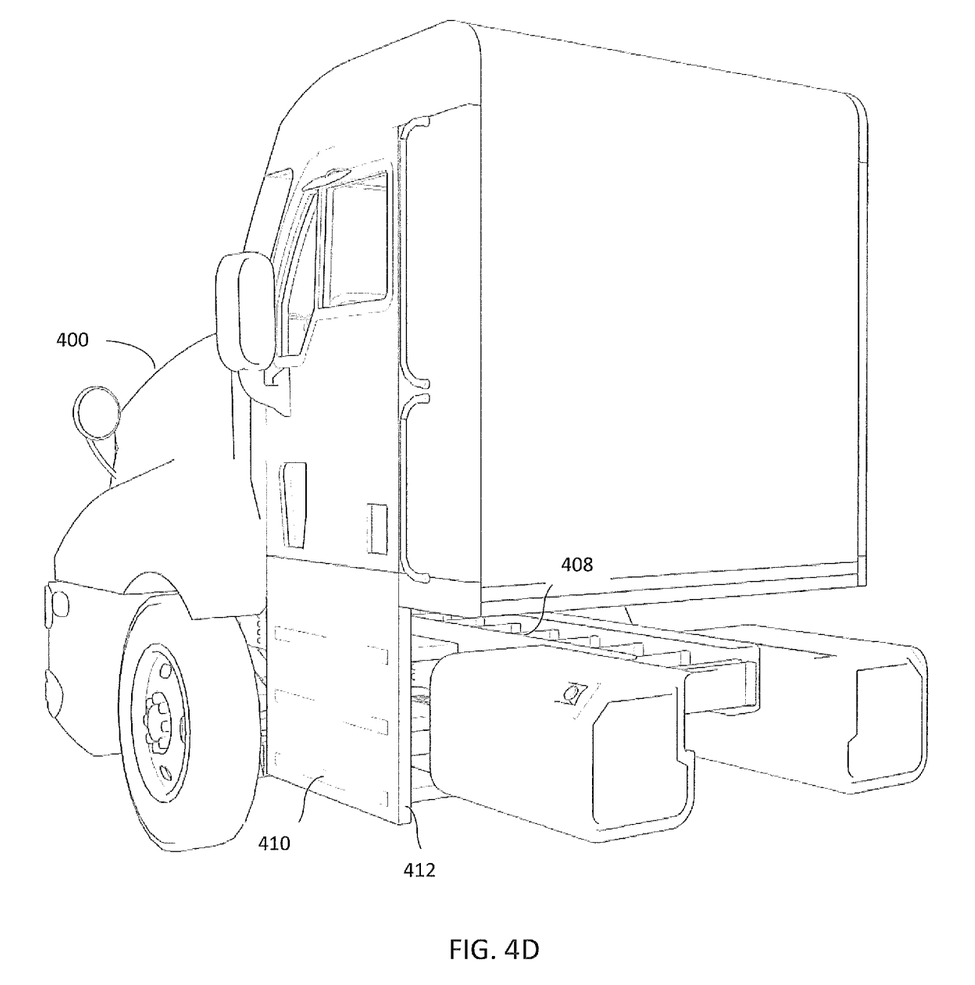
FIG. 4D illustrates an example of an AV with retractable stairs assembly extending vertically from the cabin door in the retracted position according to some embodiments.

In other embodiments, the AV may include retractable stairs assembly 412 extending vertically from the cabin 105 door as illustrated in FIG. 4C. In some embodiments, in the advanced position, steps 410 of the retractable stairs assembly 412 may extend outwardly to allow access to the cabin 105. In the retracted position, the steps 410 may be positioned inwardly towards the chassis 408 as seen in FIG. 4D. In some embodiments, the retractable stairs assembly 412 may include an actuator mechanism for moving the steps 410 in guided tracks.

Figure 4E:
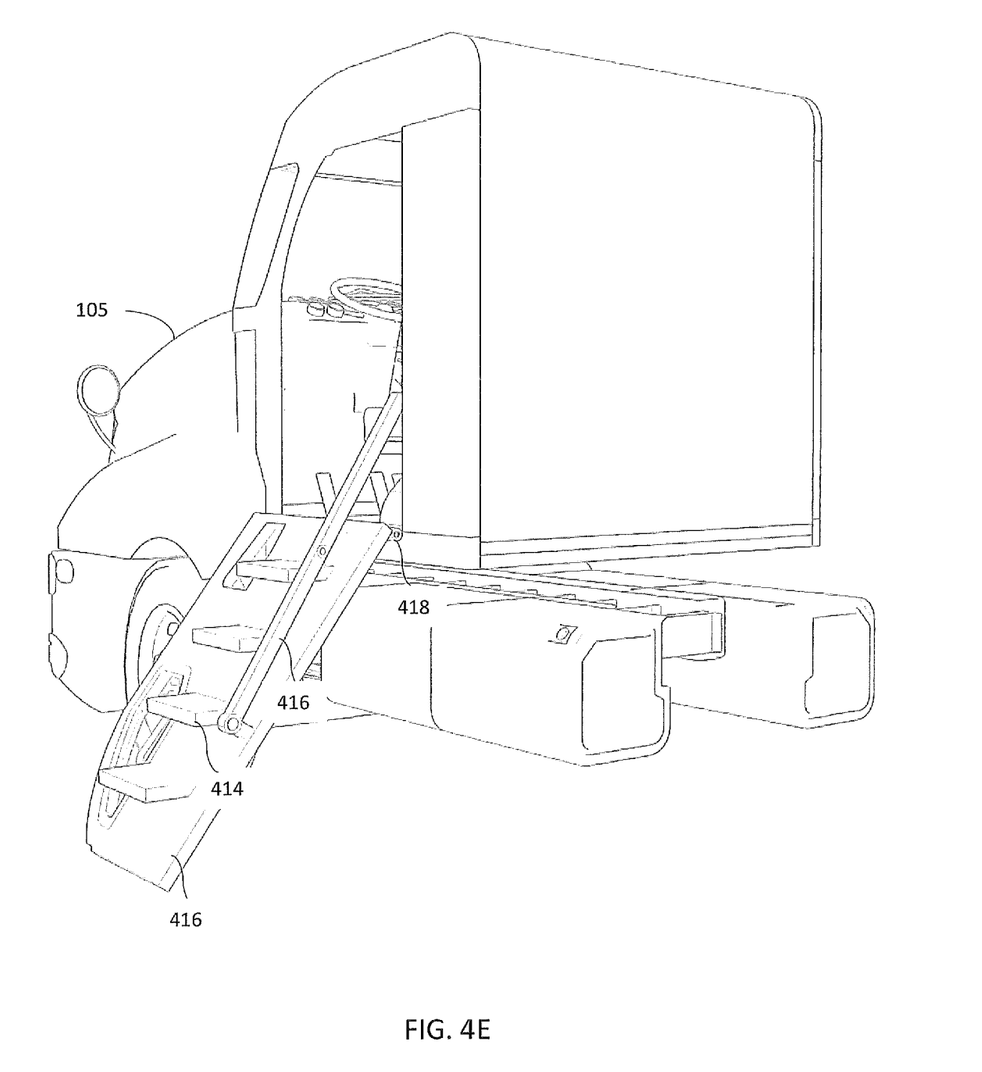
FIG. 4E illustrates an example of an AV with retractable stairs assembly fixated on the door assembly of the cabin in an advanced position according to some embodiments.
Figure 4F:
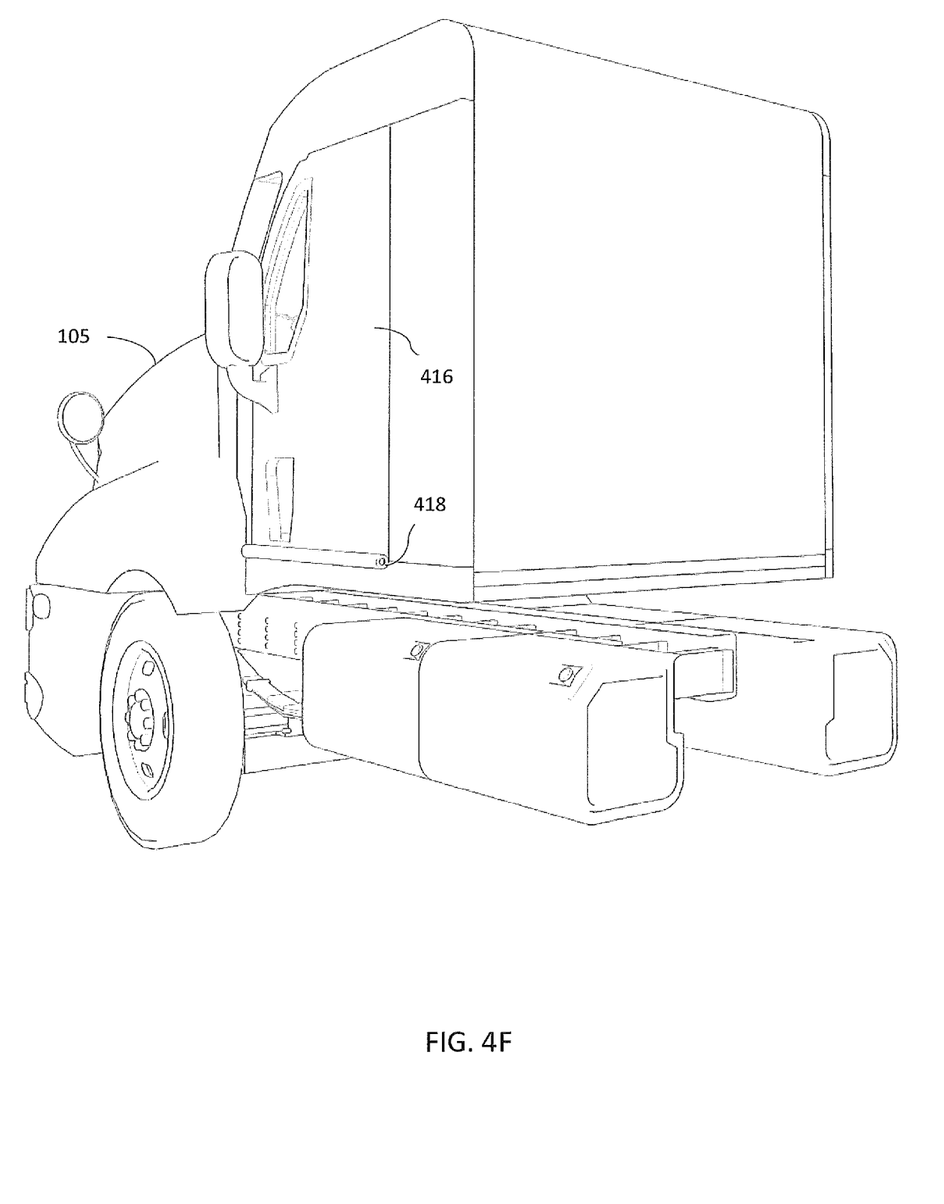
FIG. 4F illustrates an example of an AV with retractable stairs assembly fixated on the door assembly of the cabin in the retracted position according to some embodiments.

In yet another embodiment, a retractable stairs assembly 416 may be integrated with the door assembly of the cabin 105 as illustrated in FIG. 4E. A hinge/actuator mechanism 418 may comprise of two fastening elements adopted to couple the hinge respectively to the cabin 105 and to the retractable stairs assembly 416. In some embodiments, the hinge/actuator 418 allows for the retractable stairs assembly 416 to pivot at a maximum angle of substantially 180 degrees. Depending on the installation, the hinge can be controlled to pivot less than 180 degrees. In one embodiment, the maximum pivoting may be a non-adjustable feature of the hinge. In other embodiments, the maximum pivoting angle may be user adjustable feature that provides a range of maximum pivoting angles suitable for a particular purpose. In some embodiments, stairs 414 may be folded when the retractable stairs assembly 416 is in a retracted position. A further aspect provides an actuator mechanism controlling a foldable handrail 416 that is configured to move retractable stairs assembly 416 between and an advanced position (FIG. 4E) and the retracted position (FIG. 4F). In some embodiments, the actuating device may be connected to the oversight system and is operated either mechanically and/or hydraulically.

Figure 5:
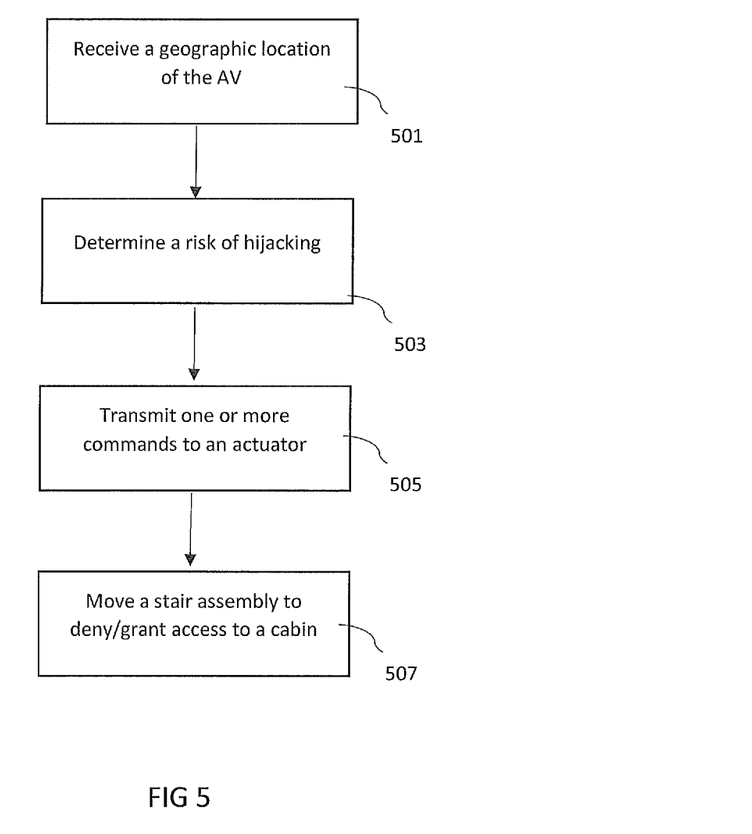
FIG. 5 illustrates the method of denying or granting access to a cabin of an AV with a movable stairs assembly according to some embodiments.

Referring next to FIG. 5, a flow diagram of a method of denying or granting access to a cabin of an AV with a movable stairs assembly is shown in accordance to some embodiments. In this example, at block 501, the oversight system 350 (FIG. 3) receives a geographic location of the AV. In some embodiments, the oversight system 350 (FIG. 3) may receive a geographic location when the AV enters a predetermined geographic range. A predetermined geographic range may include a service terminal, a loading yard, or a weigh station.

At block 503, the oversight system determines a potential risk of hijacking/hacking the AV. In some embodiments, the determination of the risk of the AV being hacked/hijacked may be based on detecting the interference with the AV communication. Additionally, the oversight system may determine the potential risk of hijacking if the user attempting to access a cabin fails to pass the authentication. In some embodiments, one or more degrees of authentications may be implemented for each predetermined geographical location. For example, if the AV is located at the weight station, the degree of authentication may increase to account for a heighted risk of hijacking. In some embodiments, the oversight system can determine that potential risk of hijacking/hacking of the AV is higher when the AV is located at predetermined geographic locations (e.g., outside of a "geofence") and thus deny access to the AV cabin while the AV is located in such predetermined geographic locations.

At block 505, the oversight system transmits one or more commands to an actuator mechanism of the AV in response to determining the potential hijacking risk. The one or more commands signals the actuator to move the stairs assembly from an extended position to a retracted position.

At block 507, the actuator mechanism of the AV, in response to receiving the one or more commands from the oversight system, may rotate the stairs assembly between the extended position and the retracted position, where the extended position is diametrically opposite to the retracted position, in accordance to some embodiments. In other embodiments, the actuator mechanism of the AV may move a plurality of steps of the stairs assembly by sliding the plurality of steps on a guided track between the extended position and the retracted position, where in the extended position the plurality of steps are extended outwardly from the AV and in the retracted position, the plurality steps are extended inwardly towards a chassis of the AV. In another embodiment, the actuator mechanism of the AV may vertically pivot the stairs assembly by between the extended position and the retracted position, where in the retracted position the stairs assembly closes a cabin door and, in the extended position, the stairs assembly is lowered to ground.

To allow for communication between autonomous vehicles in a fleet and an oversight system or command center, each autonomous vehicle may be equipped with a communication gateway. The communication gateway may have the ability to do any of the following: allow for AV to oversight system communication (i.e. V2C) and the oversight system to AV communication (C2V); allow for AV to AV communication within the fleet (V2V); transmit the availability or status of the communication gateway; acknowledge received communications; ensure security around remote commands between the AV and the oversight system; convey the AV's location reliably at set time intervals; enable the oversight system to ping the AV for location and vehicle health status; allow for streaming of various sensor data directly to the command or oversight system; allow for automated alerts between the AV and oversight system; comply to ISO 21434 standards; and the like.

An oversight system or command center may be operated by one or more human, also known as an operator or a remote center operator (RCO). The operator may set thresholds for autonomous vehicle health parameters, so that when an autonomous vehicle meets or exceeds the threshold, precautionary action may be taken. Examples of vehicle health parameters for which thresholds may be established by an operator may include any of: fuel levels; oil levels; miles traveled since last maintenance; low tire-pressure detected; cleaning fluid levels; brake fluid levels; responsiveness of steering and braking subsystems; Diesel exhaust fluid (DEF) level; communication ability (e.g., lack of responsiveness); positioning sensors ability (e.g., GPS, IMU malfunction); impact detection (e.g., vehicle collision); perception sensor ability (e.g., camera, LIDAR, radar, microphone array malfunction); computing resources ability (e.g., VCU or ECU malfunction or lack of responsiveness, temperature abnormalities in computing units); angle between a tractor and trailer in a towing situation (e.g., tractor-trailer, 18-wheeler, or semi-truck); unauthorized access by a living entity (e.g., a person or an animal) to the interior of an autonomous truck; and the like. The precautionary action may include execution of a minimal risk condition (MRC) maneuver, seeking service, or exiting a highway or other such re-routing that may be less taxing on the autonomous vehicle. An autonomous vehicle whose system health data meets or exceeds a threshold set at the oversight system or by the operator may receive instructions that are automatically sent from the oversight system to perform the precautionary action.

The operator may be made aware of situations affecting one or more autonomous vehicles in communication with or being monitored by the oversight system that the affected autonomous vehicle(s) may not be aware of Such situations may include: irregular or sudden changes in traffic flow (e.g., traffic jam or accident); abrupt weather changes; abrupt changes in visibility; emergency conditions (e.g., fire, sinkhole, bridge failure); power outage affecting signal lights; unexpected road work; large or ambiguous road debris (e.g., object unidentifiable by the autonomous vehicle); law enforcement activity on the roadway (e.g., car chase or road clearing activity); and the like. These types of situations that may not be detectable by an autonomous vehicle may be brought to the attention of the oversight system operator through traffic reports, law enforcement communications, data from other vehicles that are in communication with the oversight system, reports from drivers of other vehicles in the area, and similar distributed information venues. An autonomous vehicle may not be able to detect such situations because of limitations of sensor systems or lack of access to the information distribution means (e.g., no direct communication with weather agency). An operator at the oversight system may push such information to affected autonomous vehicles that are in communication with the oversight system. The affected autonomous vehicles may proceed to alter their route, trajectory, or speed in response to the information pushed from the oversight system. In some instances, the information received by the oversight system may trigger a threshold condition indicating that MRC (minimal risk condition) maneuvers are warranted; alternatively, or additionally, an operator may evaluate a situation and determine that an affected autonomous vehicle should perform a MRC maneuver and subsequently send such instructions to the affected vehicle. In these cases, each autonomous vehicle receiving either information or instructions from the oversight system or the oversight system operator uses its on-board computing unit (i.e. VCU) to determine how to safely proceed, including performing a MRC maneuver that includes pulling-over or stopping.

An oversight system or command center may allow a third party to interact with the oversight system operator, with an autonomous truck, or with both the human system operator and an autonomous truck. A third party may be a customer whose goods are being transported, a law enforcement or emergency services provider, or a person assisting the autonomous truck when service is needed. In its interaction with a third party, the oversight system may recognize different levels of access, such that a customer concerned about the timing or progress of a shipment may only be allowed to view status updates for an autonomous truck, or may able to view status and provide input regarding what parameters to prioritize (e.g., speed, economy, maintaining originally planned route) to the oversight system. By providing input regarding parameter prioritization to the oversight system, a customer can influence the route and/or operating parameters of the autonomous truck. In some embodiments, the oversight system may allow access to the members of government agencies or operators authorized by the government, members of emergency services, such as law enforcement by causing the actuator mechanism to advance the retractable stairs assembly. In some embodiments, the oversight system may receive authorization data from an identification verifier input device configured to authenticate the members of government agencies or law enforcement.

Features of an Autonomous Driving System in an Autonomous Truck

Actions that an autonomous vehicle, particularly an autonomous truck, as described herein may be configured to execute to safely traverse a course while abiding by the applicable rules, laws, and regulations may include those actions successfully accomplished by an autonomous truck driven by a human. These actions, or maneuvers, may be described as features of the truck, in that these actions may be executable programming stored on the VCU 150 (i.e., the in-vehicle control computer unit). These actions or features may include those related to reactions to the detection of certain types of conditions or objects such as: appropriate motion in response to detection of an emergency vehicle with flashing lights; appropriate motion in response to detecting one or more vehicles approaching the AV, motions or actions in response to encountering an intersection; execution of a merge into traffic in an adjacent lane or area of traffic; detection of need to clean one or more sensor and the cleaning of the appropriate sensor; and the like. Other features of an autonomous truck may include those actions or features which are needed for any type of maneuvering, including that needed to accomplish the features or actions that are reactionary, listed above. Such features, which may be considered supporting features, may include: the ability to maintain an appropriate following distance; the ability to turn right and left with appropriate signaling and motion, and the like. These supporting features, as well as the reactionary features listed above, may include controlling or altering the steering, engine power output, brakes, or other vehicle control subsystems 146.

Though much of this document refers to an autonomous truck, it should be understood that any autonomous ground vehicle may have such features. Autonomous vehicles which traverse over the ground may include: semis, tractor-trailers, 18 wheelers, lorries, class 8 vehicles, passenger vehicles, transport vans, cargo vans, recreational vehicles, golf carts, transport carts, and the like.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. An autonomous vehicle (AV) security system, comprising:
   an autonomous vehicle (AV) comprising:
   a vehicle sensor subsystem;
   vehicle drive subsystems;
   an in-vehicle control computer;
   an actuator mechanism configured to receive one or more commands, from an oversight system, for moving a stairs assembly between a first and second states,
   wherein the oversight system receives a geographic location of the AV and transmits the one or more commands to the actuator mechanism based on determining a risk of hijacking the AV in the received geographic location.

2. The system of claim 1, wherein the stairs assembly is hingedly connected to a cabin of the AV and configured to rotate between the first state and the second state, wherein the first state is diametrically opposite to the second state.

3. The system of claim 1, wherein the stairs assembly comprises a plurality of steps configured to slide on a guided track.

4. The system of claim 3, wherein in the first state of the stairs assembly, the plurality steps are extended outwardly from the AV and in the second state, the plurality steps are extended inwardly towards a chassis of the AV.

5. The system of claim 3, wherein the stairs assembly extends vertically from a cabin door of the AV.

6. The system of claim 1, wherein the stairs assembly is mounted on a cabin door of the AV and pivotally coupled through a hinge assembly to a bottom portion of a cabin.

7. The system of claim 6, wherein the hinge assembly comprises a rotational axis substantially parallel to ground.

8. The system of claim 7, wherein the stairs assembly is configured to rotate between the first state and the second state, wherein in the first state, the stairs assembly closes the cabin door and in the second state, the stairs assembly is vertically lowered to the ground.

9. A method for protecting an autonomous vehicle (AV) controlled via an oversight system, comprising:
   receiving a geographic location of the AV;
   determining a risk of hijacking the AV; and
   transmitting, to an actuator mechanism of the AV, one or more commands for a moving stairs assembly between a first state and a second state.

10. The method of claim 9, further transmitting the one or more commands if the risk of hijacking the AV is above a predetermined threshold for the received geographic location of the AV.

11. The method of claim 9, wherein the determination of the risk of hijacking the AV comprises detecting an interference in communications between the oversight system and the AV.

12. The method of claim 9, wherein, in the first state, the stairs assembly provides access to a cabin of the AV and in the second state removes access to the cabin.

13. The method of claim 9, further comprising transmitting the one or more commands configured to signal the actuator mechanism to move the stairs assembly into the first state in response to determining presence of a member of a government agency requesting access to the cabin of the AV.

14. The method of claim 9, further comprising transmitting the one or more commands configured to signal the actuator mechanism to move the stairs assembly into the first state in response to receiving an authorization from an identification verifier input device.

15. A method for denying access to an autonomous vehicle (AV) via a movable stairs assembly, comprising:
   receiving, from an oversight system, one or more commands at an actuator mechanism of the AV configured to mechanically control the movable stairs assembly,
   wherein the receiving of the one or more commands is based on determining, at the oversight system, a geographic location of the AV and a risk of hijacking; and
   signaling the actuator mechanism, through the one or more commands, to move the stairs assembly from an extended position to a retracted position.

16. The method of claim 15, wherein the actuator mechanism moves the stairs assembly by rotating between the extended position and the retracted position, wherein the extended position is diametrically opposite to the retracted position.

17. The method of claim 15, the actuator mechanism moves a plurality of steps of the stairs assembly by sliding the plurality of steps on a guided track between the extended position and the retracted position, wherein, in the extended position, the plurality of steps are extended outwardly from the AV and, in the retracted position, the plurality steps are extended inwardly towards a chassis of the AV.

18. The method of claim 15, wherein the actuator mechanism moves the stairs assembly by vertically pivoting between the extended position and the retracted position, wherein, in the retracted position, the stairs assembly closes a cabin door and, in the extended position, the stairs assembly is lowered to ground.

19. The method of claim 15, further comprising receiving the one or more commands in response to transmitting an authorization information from an identification verifier input device.

20. The method of claim 15, wherein the determination of the risk of hijacking is further based on detecting an interference in communication between the oversight system and the AV.

* * * * *